(No Model.)
I. L. STOVER.
STEAM BOILER TUBE CLEANER.
No. 270,614. Patented Jan. 16, 1883.
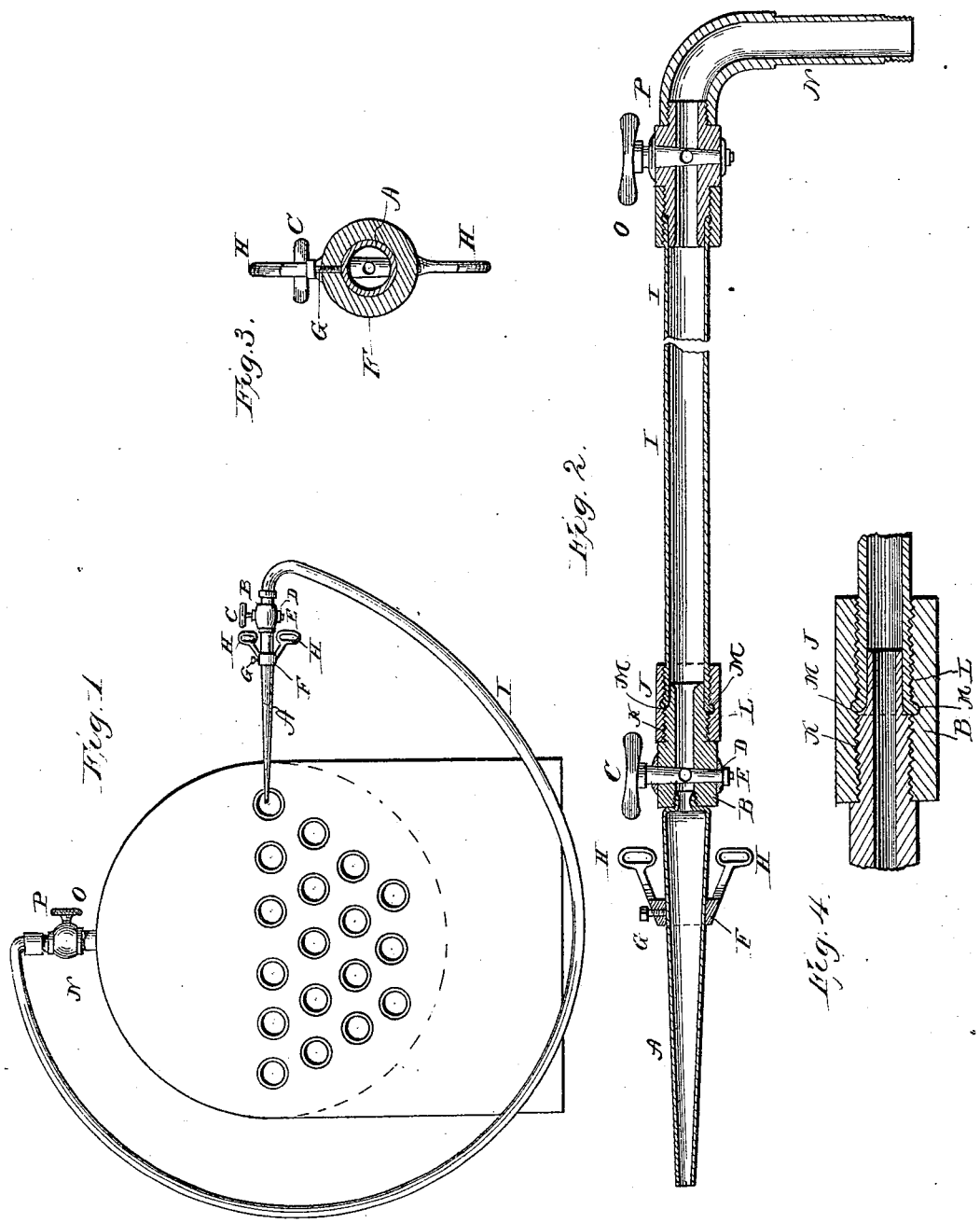
WITNESSES
F. L. Ourand
J. R. Littell
INVENTOR
Isaac L. Stover
by C. A. Snow & Co.
Attorneys.

UNITED STATES PATENT OFFICE.

ISAAC L. STOVER, OF CENTRALIA, ILLINOIS.

STEAM-BOILER-TUBE CLEANER.

SPECIFICATION forming part of Letters Patent No. 270,614, dated January 16, 1883.

Application filed November 27, 1882. (No model.)

*To all whom it may concern:*

Be it known that I, ISAAC L. STOVER, a citizen of the United States, residing at Centralia, in the county of Marion and State of Illinois, have invented a new and useful Steam-Boiler-Tube Cleaner, of which the following is a specification, reference being had to the accompanying drawings.

This invention relates steam-boiler-flue cleaners, and has for its object to provide a device of this kind which shall be simple, effective, and easily managed.

It consists to this end of certain improvements in the construction of the same, which will be hereinafter fully described, and particularly pointed out in the claims.

In the drawings, Figure 1 is a perspective view of the device complete, and in position for operation. Fig. 2 is a longitudinal sectional view of the pipe and nozzle. Fig. 3 is a cross-section on the line $x$ $x$, Fig. 2; and Fig. 4 is a detail sectional view, showing the connection of the cut-off and the rubber hose by means of the union or coupling sleeve.

The same letters refer to the same parts in all the figures.

A represents a suitable nozzle, which is screw-threaded at its base, so as to be readily attached to the cut-off B, embodying the cock or valve C, which is held to its seat by a washer, D, and jam-nut E.

F is a sleeve or band, which is slid upon the nozzle A, and held in position by means of a set-screw, G. Band F has a pair of handles, H H, by means of which the nozzle A may be conveniently manipulated without danger of the operator burning or scalding his hands.

I is a suitable rubber or other flexible hose or tube, one end of which is connected to the cut-off B by means of a sleeve or union, J, having right and left hand female threads. The cut-off B has a screw-threaded collar, K, the end of which is reduced so as to form a flange, L, over which the rubber hose may be drawn. The sleeve or union J has, between its right and left hand threads, an annular groove or recess, M.

It will be observed that when the parts are put together and the coupling sleeve or union is turned it works itself upon the threaded collar K, and at the same time draws the rubber hose over the flange L until it strikes the end of collar K, when it is forced outward and into the annular recess M of the coupling-sleeve, thus forming a steam-tight and very secure joint.

The steam-boiler has a pipe, N, located at any desired point where dry steam may be taken, and provided with a cut-off, O, having a cock or valve, P, and to which the other end of the rubber hose is secured in the same manner, as above described.

The operation of my invention will be readily understood. By applying the nozzle to the boiler-flues and turning on steam the accumulated cinders, ashes, and other impurities will be blown or forced out. The operator may control the flow of steam by the cock or valve C, while the supply is governed by the valve P.

When the device is not in use the hose may be readily detached from the cut-off O, and coiled up and stored away.

I claim as my invention—

1. The combination of the cut-off having a threaded collar, the end of which is reduced so as to form a flange, the rubber or flexible hose, and the union or right and left threaded coupling-sleeve having an annular recess between its right and left hand threads, as set forth.

2. The combination, with a steam-boiler having a pipe provided with a cut-off, of the nozzle having an adjustable band provided with handles, a cut-off attached to said nozzle, and a flexible hose connected to the cut-offs by union-couplings having interior annular grooves, as herein set forth.

In testimony that I claim the foregoing as my own I have hereto affixed my signature in presence of two witnesses.

ISAAC L. STOVER.

Witnesses:
SAMUEL H. AUSTIN,
WM. SNOW.